United States Patent
Packert et al.

(10) Patent No.: US 7,667,606 B2
(45) Date of Patent: Feb. 23, 2010

(54) RF ENABLED SURGICAL CART AND USE OF SAME IN OPERATING ROOM ENVIRONMENT

(75) Inventors: Tom Packert, Miami, FL (US); Jay Pierce, Miami, FL (US); Robert J. Griffin, Richmond Hill (CA); John K. Stevens, Stratham, NH (US)

(73) Assignee: Visible Assets, Inc, Mississauga, Ontario (CA)

( * ) Notice: Subject to any disclaimer, the term of this patent is extended or adjusted under 35 U.S.C. 154(b) by 162 days.

(21) Appl. No.: 11/928,800

(22) Filed: Oct. 30, 2007

(65) Prior Publication Data

US 2008/0246610 A1 Oct. 9, 2008

Related U.S. Application Data

(60) Provisional application No. 60/863,540, filed on Oct. 30, 2006.

(51) Int. Cl.
*G08B 23/00* (2006.01)

(52) U.S. Cl. ............... 340/573.1; 340/572.1; 340/572.4; 340/539.13; 340/539.16; 340/539.17; 340/825.49; 340/825.69

(58) Field of Classification Search .............. 340/572.1, 340/572.4, 573.1, 539.1, 539.13, 539.16, 340/539.17, 539.21, 825.49, 825.69
See application file for complete search history.

(56) References Cited

U.S. PATENT DOCUMENTS

| | | | |
|---|---|---|---|
| 4,275,385 A | | 6/1981 | White et al. |
| 6,571,128 B2 * | | 5/2003 | Lebel et al. .................. 607/60 |
| 6,954,148 B2 * | | 10/2005 | Pulkkinen et al. ........ 340/572.1 |
| 7,448,544 B1 * | | 11/2008 | Louie et al. ................. 235/385 |
| 2002/0188259 A1 | | 12/2002 | Hickle et al. |
| 2004/0069849 A1 | | 4/2004 | Stevens et al. |
| 2004/0201454 A1 | | 10/2004 | Waterhouse et al. |
| 2004/0205350 A1 | | 10/2004 | Waterhouse et al. |
| 2005/0035862 A1 * | | 2/2005 | Wildman et al. ......... 340/573.1 |
| 2005/0043850 A1 | | 2/2005 | Stevens et al. |
| 2005/0083213 A1 | | 4/2005 | Stevens et al. |
| 2005/0149226 A1 | | 7/2005 | Stevens et al. |
| 2005/0149358 A1 | | 7/2005 | Sacco et al. |
| 2005/0251330 A1 | | 11/2005 | Waterhouse et al. |
| 2005/0267550 A1 * | | 12/2005 | Hess et al. .................... 607/60 |
| 2006/0128023 A1 | | 6/2006 | Waterhouse et al. |
| 2006/0164232 A1 | | 7/2006 | Waterhouse et al. |
| 2006/0220857 A1 | | 10/2006 | August et al. |
| 2006/0232417 A1 | | 10/2006 | August et al. |
| 2006/0293977 A1 | | 12/2006 | Stevens et al. |

(Continued)

*Primary Examiner*—Hung T. Nguyen
(74) *Attorney, Agent, or Firm*—Larson & Anderson, LLC

(57) ABSTRACT

Activities of individuals and the movements/usage of products are monitored in an operating room during a surgical procedure by disposing in the operating room a first transceiver operating in a long wavelength mode in which 99.99% or more of radiated energy is in the form of a magnetic field, for example 131 KHz. A distinguishable radio frequency-enabled identification tag is associated with each of a plurality of persons assigned to the surgical procedure, including for example, doctors, nurses, and/or the patient, and optionally with products to be monitored. A signal is transmitted from the first transceiver and responses from the identification tags are monitored. A log is created from the monitored responses indicative activities of each of the persons in the operating room or of movements of tagged products.

11 Claims, 5 Drawing Sheets

U.S. PATENT DOCUMENTS

| | | |
|---|---|---|
| 2007/0001846 A1 | 1/2007 | August et al. |
| 2007/0063895 A1 | 3/2007 | August et al. |
| 2007/0096875 A1 | 5/2007 | Waterhouse et al. |
| 2007/0115132 A1 | 5/2007 | August et al. |
| 2007/0120649 A1 | 5/2007 | Stevens et al. |
| 2007/0132555 A1 | 6/2007 | August et al. |
| 2007/0152824 A1 | 7/2007 | Waterhouse et al. |
| 2007/0152825 A1 | 7/2007 | August et al. |
| 2007/0152826 A1 | 7/2007 | August et al. |
| 2007/0171076 A1 | 7/2007 | Stevens et al. |
| 2007/0196456 A1 | 8/2007 | Stevens et al. |
| 2007/0247316 A1 | 10/2007 | Wildman et al. |

\* cited by examiner

Procedure Window

RF ENABLED SURGICAL CART AND USE OF SAME IN OPERATING ROOM ENVIRONMENT

STATEMENT OF RELATED APPLICATIONS

This application claims the benefit of U.S. Provisional Application No. 60/863,540, filed Oct. 30, 2006, which application is incorporated herein by reference in its entirety.

This application is related to commonly assigned application Ser. No. 11/768,702, filed Jun. 26, 2007, which is incorporated herein by reference in its entirety.

BACKGROUND OF THE INVENTION

This application relates to the use of an RF-enabled surgical cart in an operating room environment to provide monitoring and records of the surgery and the equipment used by operating room personnel during a surgery.

U.S. Pat. No. 4,275,385 to White, which is incorporated herein by reference, discloses a personnel locating system where individuals to be located wear transmitters, and each transmitter transmits a signal which corresponds to the identity of the wearer. This information is relayed to and displayed at a central control unit. The information may also be displayed at remote terminals, used to control access to equipment or locations, or conveyed via a telephone interface to a telephone switching network to call the nearest telephone or to page the wearer of the transmitter. US Patent Publication No. 20070247316 for tracking the movement of personnel throughout a hospital using RFID tags.

US Patent Publication No. 20050149358 discloses an RFID-based system for tracking billable anesthesiology time in a surgical environment employs hand-held RFID reader devices that record and store timed anesthesia events for each surgical patient. Each patient is assigned a reader device, uploaded with patient data. Each anesthesiology professional has an identifying RFID transponder, and room transponders are located on wall or doorway of each room in the surgical suite.

US Patent Publication No. 20020188259 discloses medical supplies with smart tags, for example RFID tags.

One of the drawbacks of conventional RFID tags is their ability to function with substantial reliability in difficult environments such as environments with large metallic masses, particularly in circumstances where there may be a plurality of tags, and where the tags may be moving. One such difficult environment is a hospital operating room during surgery, where people are constantly moving and where there are large amount of metal, including the equipment such as tables, tanks for compressed gases, and pumps. The present invention provides the benefits of the general idea of using RFID tags in the type of environment found in an operating room during a surgical procedure through the use of an alternative communications protocol, which is actually shown to work with sufficient reliability to achieve the desired goals of tracking personnel and equipment within the room using a transceiver while not interfering with electrical equipment such as life support equipment functioning in the operating room during the surgery.

SUMMARY OF THE INVENTION

The present invention provides a method for monitoring activities in a operating room during a surgical procedure. The method comprises the steps of:

(a) disposing in the operating room a first transceiver operating in a long wavelength mode in which 99.99% or more of radiated energy is in the form of a magnetic field, for example 131 KHz, (b) associating a distinguishable radio frequency-enabled identification tag with each of a plurality of persons assigned to the surgical procedure, including for example, doctors, nurses, and/or the patient;

(c) transmitting a signal from the first transceiver and monitoring responses from the identification tags, and (d) creating a log from the monitored responses indicative activities of each of the persons in the operating room.

In some embodiments of the invention, additional transceivers are disposed in the operating room to increase reliability, and to provide the option of 3D positional location of identification tags.

In some embodiments, the first transceiver and optionally the additional transceivers are disposed in association with a portable, rolling cart.

DETAILED DESCRIPTION OF THE INVENTION

Figure 1:
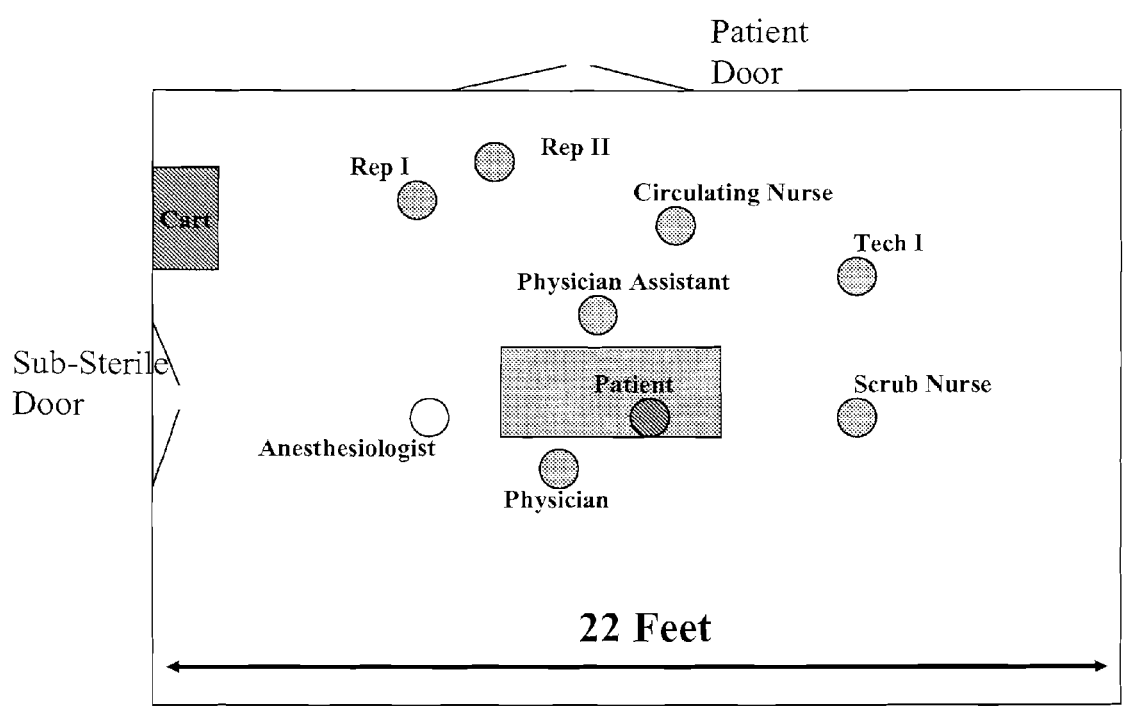
FIG. 1 shows the disposition of things and people in an operating room used in the test of the method.

The present application relates to the use of radio tags that are tuned to operate as long wavelength inductive tags. These tags uses long wavelengths below 1 megahertz, for example between 10 KHz to 500 KHz (Low frequency or Ultra Low Frequency ULF, as defined by Part 15 rules of the FCC) which are suitable for inductive tags, preferably below 300 KHz. Since the wavelength is so long at these low frequencies over 99% of the radiated energy, for example 99.99%, is magnetic as opposed to a radiated electric field.

In the method of the invention, one more transceivers operating in this long wavelength mode are disposed within an operating room during a surgical procedure. The transceiver may be placed in a fixed location within the operating room for example one designed to optimize communication with tags in the room. In some embodiments of the invention, however, one or more transceivers may be disposed on a portable cart. Carts of this type are extensively described in commonly U.S. patent application Ser. No. 11/768,702 filed Jun. 26, 2007, which application is incorporated herein by reference in its entirety. Basically, the cart is a conventional rolling and therefore portable cart in which one or more antennas are positioned in different locations (for example top, side, front etc). The antennas are suitably disposed at different angles to vary the direction of the fields. The transceivers may have a fixed frequency antenna, or a tunable loop antenna as described in commonly assigned U.S. patent application Ser. Nos. 11/459,647 filed Jul. 25, 2006 and 11/462,981 filed Aug. 7, 2006, both of which are incorporated herein by reference.

The method also makes use of radio frequency-enabled identification tag associated with each of a plurality of persons assigned to the surgical procedure, including for example, doctors, nurses, and/or the patient. Each of the tags used is distinguishable from the others, for example by having a different numerical identifier. As used herein, the term "associated with" refers to a physical association of the tag with the person (for example by wearing the tag as part of an ID badge) as well as a logical association as a result of which it is known which tag is worn by which person.

If desired, radio frequency-enabled tags can also be associated with implants or other materials used during the surgery. Tagged implants and surgical instruments are described in commonly assigned U.S. patent application Ser. No. 11/560,338 filed Nov. 15, 2006, which is incorporated herein by reference. Identification tags may also be associated with specific pieces of equipment used in the operating room. For example, an identification tag associated with a pump or an oxygen tank can be used to maintain a record of the specific equipment used in a given procedure.

In the method of the invention, a signal is transmitted from the first transceiver and additional optional transceivers and responses from the identification tags are monitored. The responses from a given tag may vary during the procedure as the position of the person associated with the tag changes in the room or if the person leaves the room due to changes in distances from and angle to the transceiver. These changes are used to create a log from the monitored responses indicative activities of each of the persons in the operating room.

Activities that can be monitored in accordance with the invention include: (1) the presence or absence of each person as a function of time during the procedure. For example, a OR technician who enters and leaves the room during the procedure will be automatically noted. (2) the anesthesia state of the patient. The lack of movement of the patient following onset of anesthesia is recorded as a lack of movement, and therefore a very constant signal strength which is distinguishable from pre-anesthesia signals. (3) the amount of movement and/or location of particular individuals within the operating room. Changes in signal strength, and differential signal strength between antennas can be used to provide position information for the tag and the person wearing it.

Removal of materials from the cart for use in the surgery may also be monitored through tags associated with the articles. For example it as found that the shelf of the cart on which an orthopedic implant was placed could be determined for a cart with multiple antennas, and thus that the movement of the implant from the cart, or to a different shelf on the cart could be discerned.

As demonstrated in the example set forth below, a RUBEE enabled cart placed near an outside wall (worst case position) can read tags in a 22' square operating room at almost any location within the room. The cart can be used to accurately log OR entry and exit of individuals, and can be used to identify products and individuals anywhere within the physical OR> Signal to noise ratio was excellent, and all tags were detected. Thus, the use of the antenna and identifying tags can improve OR efficiency, staff productivity, OR safety, and documentation of procedures including the presence of individuals, product use and chain of possession with essentially no change in existing procedures.

EXAMPLE

In order to establish the actual efficacy of the long wavelength inductive two-way radio tags in the environment associated with an on-going surgery, RUBEE™ tags from Visible Assets, Inc. were used in field testing. The RUBEE protocol uses a full duplex 131 KHz data carrier with amplitude modulated data communication. The long wavelength produces little, if any, energy in the form of an electrical field (E), and most of the radiated energy (99.99%) is in the form of a magnetic field (H). The RUBEE tags typically need a minimum signal of 0.1 milligauss to a maximum of 200 milligauss for reliable communication. The strongest field near or on top of a base station and high performance antenna for communication with a RUBEE tag can be about 1000 milligauss, however most standard antennas are in the 100-800 milligauss range. To provide some context for this value, the earth's magnetic field is 300-6000 milligauss.

Five separate operations were monitored. In each case, normal procedures for an orthopedic implant were followed, and all life-support equipment was active. In each field test the following materials were used:

(i) A RUBEE equipped cart with 4 antennas, three orthogonal antennas disposed on the front, side and top of the cart, and a co-planar antenna disposed on the bottom of the cart. The cart was placed on the outside wall of the operating room, which was considered to be the least desirable/most challenging location for the test.

(ii) Blaster V10 Base Station (iii) Finder V7.14 data log which cycled through each of the four antennas on the cart (iv) DataDesk V6 statistical package and data miner.

(v) 8 RUBEE tags V7.6D associated with the surgeon, the circulating nurse, the scrub nurse, the physician assistant, the OR technician, two ortho sales representatives and the patient. An additional RUBEE V7.6D tag applied to the outside of the box containing the implant to be used in the surgery.

The cart emitted a signal of about 700 milligauss and the estimated signal strength at the patient was 10-15 milligauss. The RUBEE tags produce an average signal strength of 10-20 milligauss.

Data was recorded for 30 minutes before the start of the procedure and for 15 minutes after the procedure. The general positions of persons and the cart within the room is shown in FIG. 1. The anesthesiologist in the room did not wear a tag for the test. During the surgery, the range of distances of the persons from the cart were are shown in Table 1.

TABLE 1

| Name | Distance (feet) |
| --- | --- |
| Surgeon | 9-11 |
| Circulating Nurse | 3-15 |
| Scrub Nurse | 17 |
| Physician Assistant | 8 |
| OR Technician | 3-17 and out of room |
| Sales Rep I | 6 |
| Sales rep II | 7 |
| Patient | 10 |

During the test, an independent observer recorded the presence or absence of each person, and their approximate position in the room at five minute intervals and this data was compared with the electronic data.

During the course of the tests, it was determined that the best read rates on a tag might change from one antenna on the cart to another if the person wearing the tags moved. However, the overall read rates were excellent and provided both presence detection and identification of all humans in the OR.

The signal to noise ration of all antennas was acceptable (noise typically under 5 milligauss). However, one antenna (lower shelf) selectively detected an unidentified noise source partway through the procedure. The noise source was not considered serious and the other three antennas did not detect it.

Figure 2A:
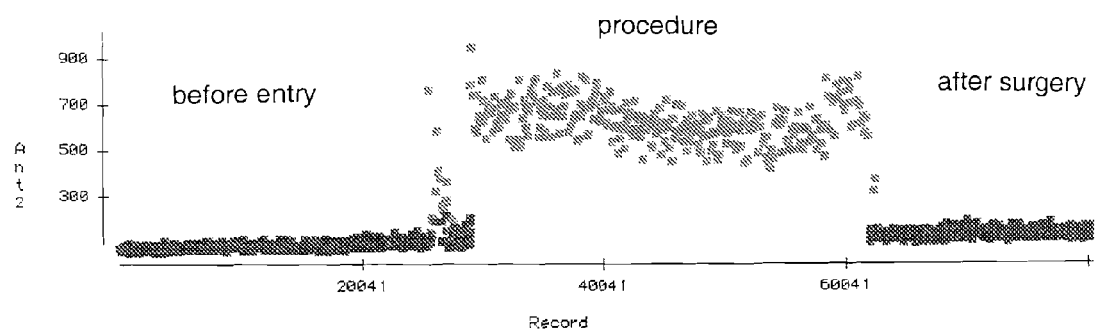
FIGS. 2A and 2B show scatterplots showing the signal strength from the tags on the patient and the surgeon respectively in one surgery involving a total left knee replacement.

FIGS. 2A and B show examples of scatterplots showing the signal strength from the tags on the patient and the surgeon respectively in one surgery involving a total left knee replacement. The signal is from one antenna (the side of the cart) which was the one that showed the best overall signal for these tags during the procedure. The signal from the antenna at the front of the cart was almost as good. As shown in FIG. 2A, prior to the entry of the patient to the room, and after the surgery, the background signal is low. While the patient was in the room, the read rate was 100% and good signal strength was obtained. The signal had a mean signal strength of 579 units (arbitrary) and a standard deviation of 67 units when the during the procedure when the patient was anesthetized. The signal was more erratic with a mean of 120 and a standard deviation of 140 prior to anesthesia and at the end of the procedure when the patient was moving from the room. Thus, signal standard deviation may be used to determine when the patient is anesthetized and when the patient is moving in the room.

Figure 2B:
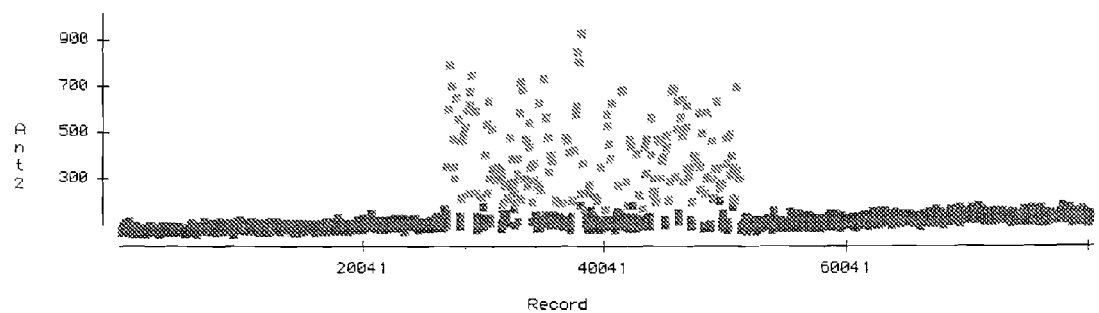

The surgeon's signal show in FIG. 2B is far more erratic since he was constantly moving around. This caused the tag to change positions and angles during the procedure. In addition, the surgeon used an electric drill for pins, an electric saw, an ultrasonic scalpel and a variety of metal instruments. Thus, the surgeon presented a great challenge than the patient. The Finder data log was set to try to read a tag 5 times before giving up. Data are summarized in Table 2. When the surgeon was in the room, the cart had a first-try successful read rate of over 42% at the front antenna and a first-try successful read rate of over 67% at the side antenna. The surgeons total read rate success at the side antenna was nearly 95% over 5 tries. Using a combination of both antennas and 5 tries the read success rate was 100%.

TABLE 2

| Description | Read Attempt | Count | Reads | Percent |
| --- | --- | --- | --- | --- |
| Surgeon Ant 1 | 1 | 232 | 98 | 42.24% |
|  | 2 | 134 | 30 | 22.39% |
|  | 3 | 104 | 16 | 15.38% |
|  | 4 | 88 | 15 | 17.05% |
|  | 5 | 73 | 16 | 21.92% |
| Read Rate |  |  |  | 78.08% |
| Surgeon Ant 2 | 1 | 228 | 154 | 67.54% |
|  | 2 | 74 | 9 | 12.16% |
|  | 3 | 65 | 5 | 7.69% |
|  | 4 | 60 | 3 | 5.00% |
|  | 5 | 57 | 3 | 5.26% |
| Read Rate |  |  |  | 94.74% |
| Patient Ant 1 | 1 | 315 | 312 | 99.05% |
|  | 2 | 3 | 3 | 100.00% |
|  | 3 | 0 | 0 | 0.00% |
|  | 4 | 0 | 0 | 0.00% |
|  | 5 | 0 | 0 | 0.00% |
| Read Rate |  |  |  | 100.00% |
| Patient Ant 2 | 1 | 289 | 289 | 100.00% |
|  | 2 | 0 | 0 | 0.00% |
|  | 3 | 0 | 0 | 0.00% |
|  | 4 | 0 | 0 | 0.00% |
|  | 5 | 0 | 0 | 0.00% |
| Read Rate |  |  |  | 100.00% |

Comparison of FIG. 2A and FIG. 2B also shows that the surgeon left the room about 25 minutes before the patient. This corresponds with the observers notes, and the fact that the physicians assistant closed up and finished the surgery.

During the procedure, the antennas at the top and bottom of the cart did not pick up much signal from the physician and the patient. These antennas did pick up good signals from the tags on the sales reps and the tag on the circulating nurse.

The tag on the implant boxes was 100% readable when the box was placed on the top-shelf, but it was readable only by the bottom shelf antenna, and not readable by the top shelf antenna. The reverse situation was also true. This is because the antennas saturate the signal from tags that are too close to the antenna. Thus, the position of a tagged box on the cart can be localized by the antennas to the shelf, allowing for example differentiation between opened and unopened boxes based on shelf placement.

Figure 3A:
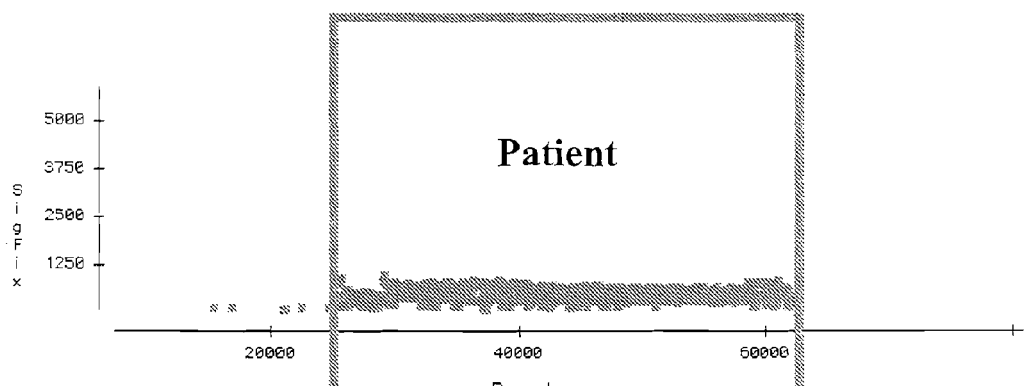
FIGS. 3A-H show signals (noise omitted) from each tag through the course of the test.
Figure 3B:
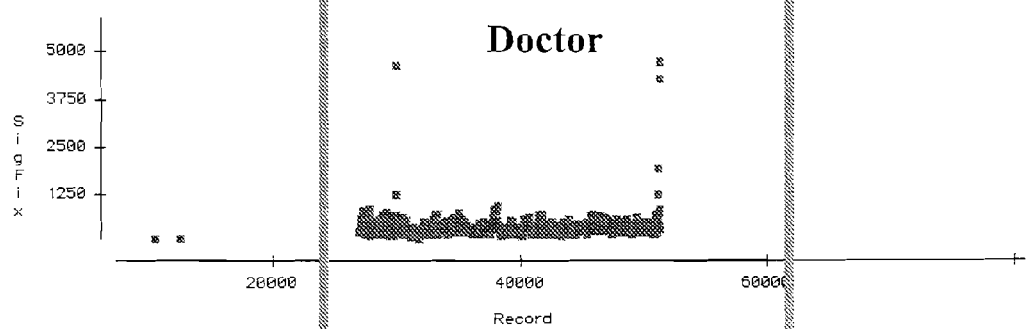
Figure 3C:
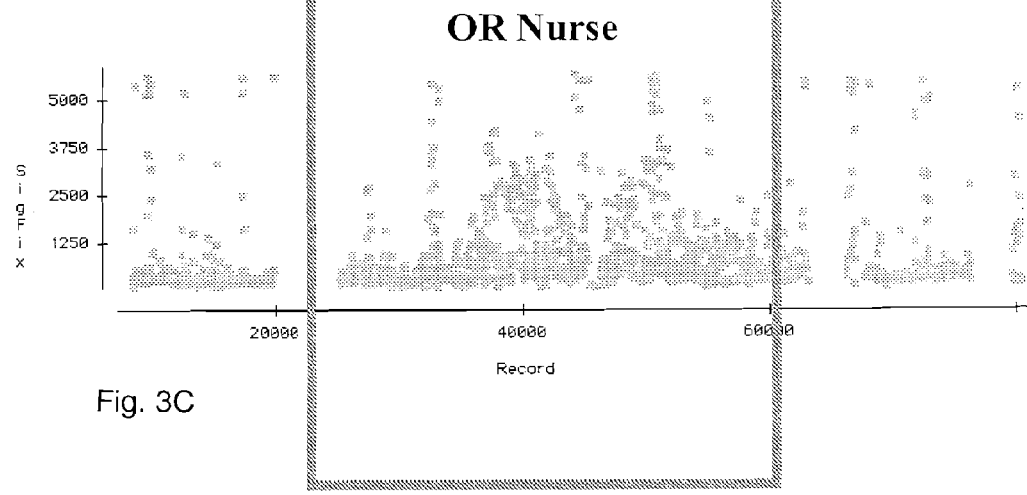
Figure 3D:
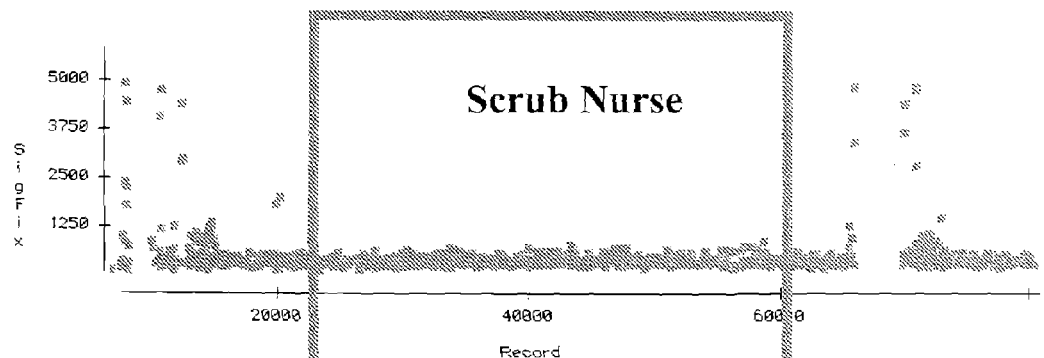
Figure 3E:
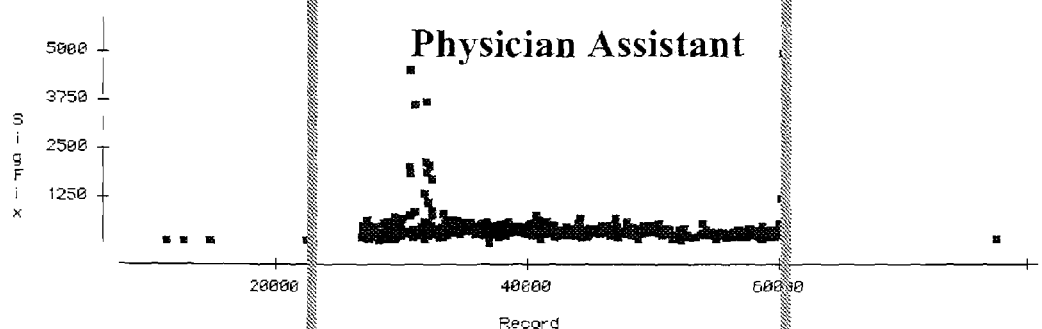
Figure 3F:
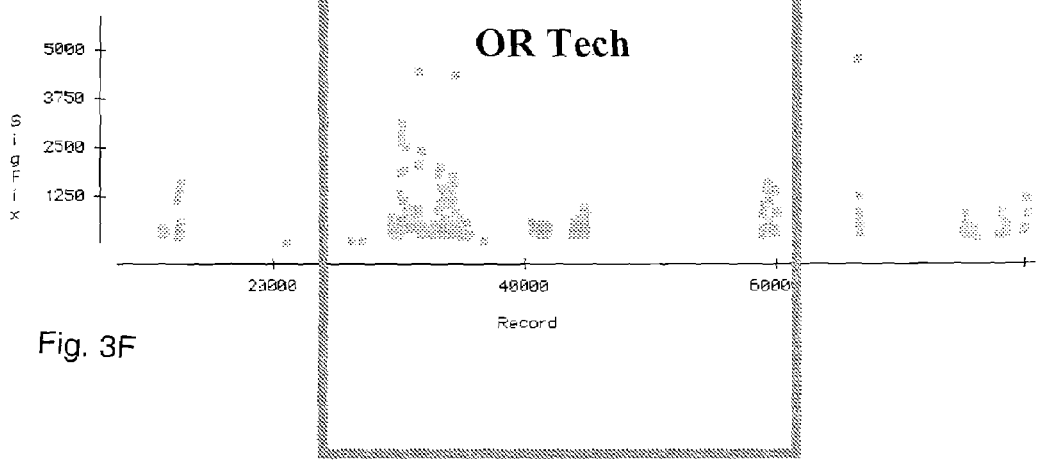
Figure 3G:
Figure 3H:
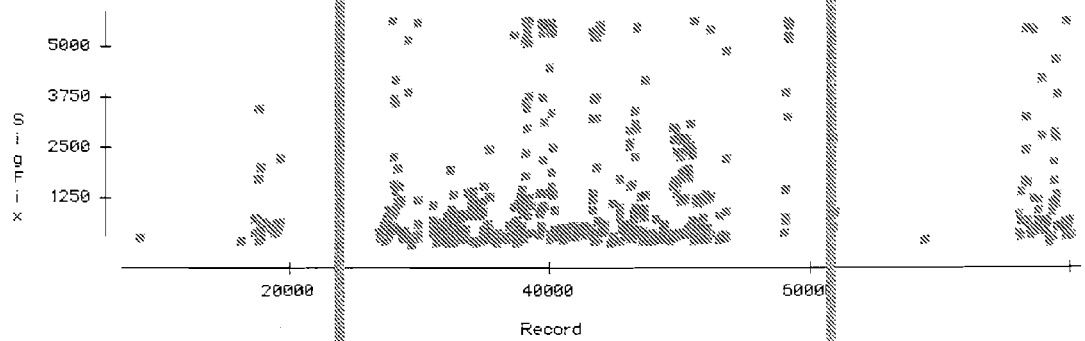

FIGS. 3A-H show data for each of the tags for successful reads only (noise omitted). Of particular interest is the information for the OR Tech, who moved in and out of the room multiple times. This is shown in FIG. 3F where there are peaks of activity separated by regions of no signal. It was observed that in some cases the presence of the OR tech in an adjacent OR was observed. This problem can be alleviated by using secondary multiplexed antennas in the hallway, or in a second cart placed in the adjacent OR which will recognize the presence of the tag in the area of that antenna and therefore subtract signals from that time period from the data for the particular operating room.

During the procedures, no evidence of EMI or EMC from the antennas, tags, or OR equipment was seen.

What is claimed is:

1. A method for monitoring activities in a operating room during a surgical procedure, comprising the steps of:
   (a) disposing in the operating room a first transceiver operating in a long wavelength mode in which 99.99% or more of radiated energy is in the form of a magnetic field,
   (b) associating a distinguishable radio frequency-enabled identification tag with each of a plurality of persons assigned to the surgical procedure,
   (c) transmitting a signal from the first transceiver and monitoring responses from the identification tags,
   (d) creating a log from the monitored responses indicative activities of each of the persons in the operating room,
   (e) further comprising the step of disposing in the operating room a second transceiver operating in a long wavelength mode in which 99.99% or more of radiated energy is in the form of a magnetic field at a location different from the first transceiver,
   (f) wherein the first transceiver is disposed in association with a portable cart, and
   (g) wherein the second transceiver is disposed in association with the portable at a different position from that of the first transceiver.

2. The method of claim 1, wherein activities of the persons comprise the presence or absence of a person from the operating room.

3. The method of claim 2, wherein activities of the persons further comprise an indication of the movement of the person within the operating room relative to the first transceiver.

4. The method of claim 1, wherein the persons include a doctor and a nurse.

5. The method of claim 4, wherein the persons further include a patient.

6. The method of claim 1, wherein the persons include a patient.

7. The method of claim 1, wherein the magnetic field is adjacent to the first transceiver is from 100 to 800 milligauss.

8. The method of claim 7, wherein a frequency of the first transceiver is 131 KHz.

9. The method of claim 1, wherein a frequency of the first transceiver is 131 KHz.

10. The method of claim 1, further comprising the step of associating an identification tag with an implant or its packaging to be implanted during the surgery, and monitoring the tag associated with the implant and creating a log of concerning movement of the implant or its packaging.

11. The method of claim 1, further comprising the step of associating an identification tag with a physical product used in the operating room and monitoring the tag associated with the physical product and creating a log of concerning movement of the physical product.

* * * * *